Sept. 12, 1939. A. L. SMITH 2,172,643
ELECTRICAL CONTROL MEANS
Filed Sept. 23, 1936
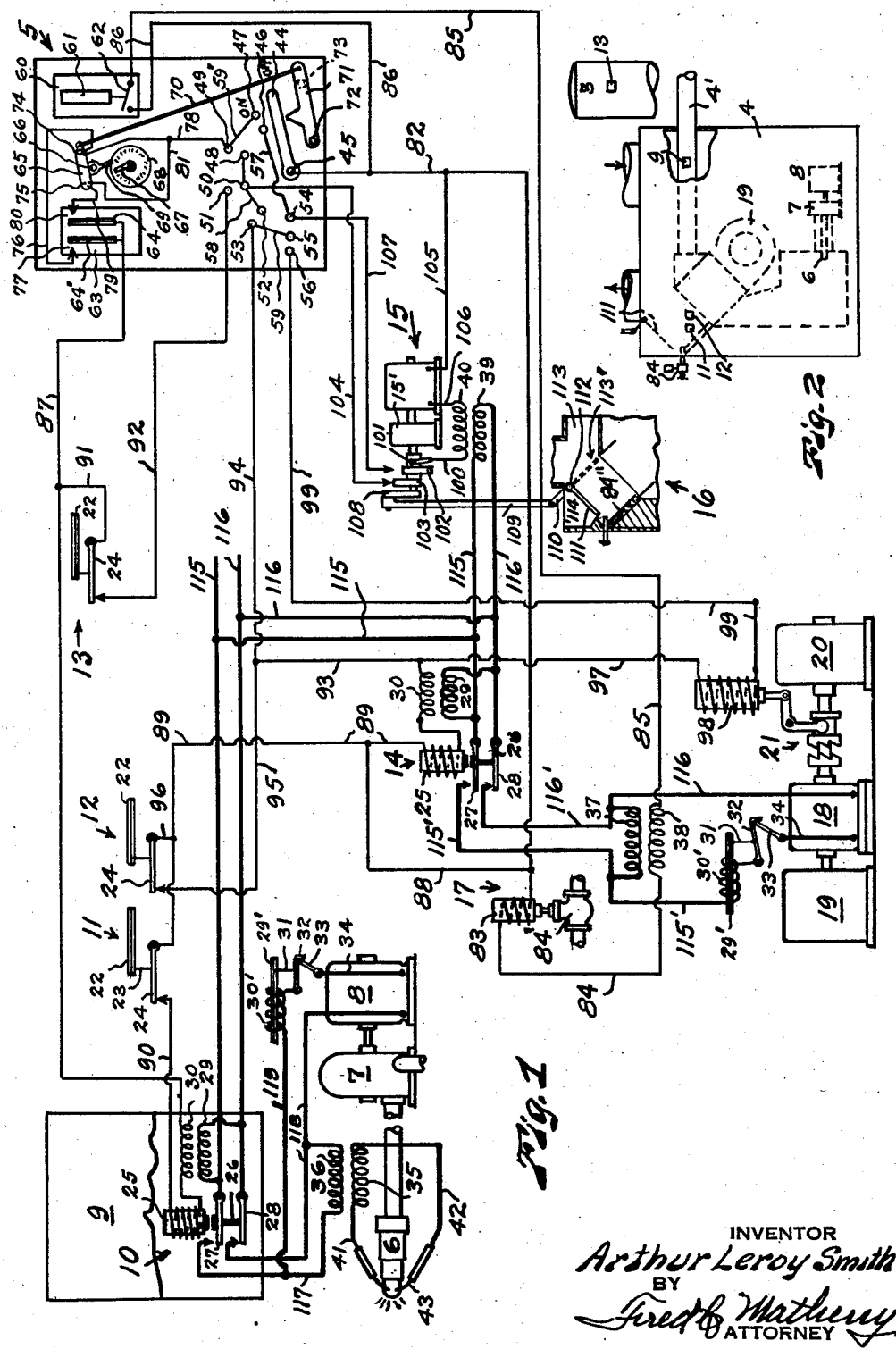
INVENTOR
Arthur Leroy Smith
BY
Fred B. Matheny
ATTORNEY Patented Sept. 12, 1939

2,172,643

UNITED STATES PATENT OFFICE 2,172,643

ELECTRICAL CONTROL MEANS

Arthur Leroy Smith, Bryn Mawr, Wash.

Application September 23, 1936, Serial No. 102,080

9 Claims. (Cl. 236—1)

This invention relates to electrical control means for an air conditioning, air circulating and water heating plant and the primary object of this invention is to provide central control means which will make it possible to secure any desired operation or sequence of operations of the air conditioning, air circulating and water heating plant by a simple and easily understandable setting of the control means.

Another primary object of the invention is to provide a control means of this nature which is substantially foolproof, which will safeguard the air conditioning, air circulating and water heating plant with which it is connected and which will make it substantially impossible for a user of the plant to bring about undesirable air conditioning.

Another object of the invention is to provide a central control means of this nature in which all of the manually controlled circuits are controlled by a single, easily operable, switch member movable to selective positions to selectively operate different control circuits or different combinations of control circuits.

Another object of the invention is to provide novel means for controlling day and night operation of a plant of this nature, said means comprising manually operated devices for lowering the setting of thermostat means for night temperatures at the time of retirement, and clock operated means for raising the setting of the thermostatic means for day temperatures at a predetermined set time in the morning without requiring any calculation on the part of the user as to the number of hours elapsing between the time the device is set for night temperatures and the time of return to the day temperature level.

Another object of the invention is to provide a control means which makes it possible to supply energy to the ignition circuit of an oil burner without operating the motor which supplies fuel to said burner, thus making it possible to inspect and adjust the burner ignition means while said ignition means is supplied with current without simultaneously discharging oil from the burner.

Other and more specific objects of the invention will be apparent from the following description taken in connection with the accompanying drawing.

The term air conditioning or conditioning of air is herein used as including heating, cooling, humidifying, cleaning and purifying of the air. This control is suitable for use in connection with a plant where the air is to be heated, cooled, washed, humidified, dried out, cleaned of smoke, dust, odors, and the like, treated in any other way and circulated as desired.

In the drawing Figure 1 is a diagram of electric control means embodying this invention, showing the same in connection with air conditioning, air circulating and water heating means.

Fig. 2 is a small scale diagrammatic view illustrating diagrammatically one arrangement with respect to a heating and air conditioning plant of a plurality of units embodied in this control system.

Referring to the drawing, the numeral 5 designates generally a centralized unitary control mechanism for an air conditioning, air circulating and water heating plant which is adapted to regulate the temperature, humidity and circulation of the air and the temperature of water. The numeral 6 designates an oil atomizing burner nozzle of a type commonly used in connection with oil burners. 7 designates an oil pump and 8 is a motor adapted to drive said pump to supply oil or like fuel to the burner nozzle. 9 is a conventional stack switch positioned in the stack 4' of a furnace where it is subject to temperature variations of the discharging flue gases. The stack switch 9 has a transformer relay set embodied therein and indicated generally by 10. In addition to the transformer relay set 10 the stack switch 9 is provided with the usual time delay safety means, not shown, for stopping the burner motor 8 in the event temperature conditions in the stack do not become normal within a predetermined period of time after the starting circuits to the burner motor are closed. As this time delay safety means is of well known construction and as it is not a part of this invention it is not herein shown and described in detail.

Numerals 11, 12 and 13 designate generally a limit switch, a fan switch and an aquastat switch respectively. These switches are all thermostatically operated. 14 designates generally a transformer relay set, 15 a damper motor, 16 a by-pass damper mechanism, 17 a solenoid controlled water valve, 18 a fan motor, 19 a fan or blower driven by the motor 18 and 20 a mechanical refrigerating mechanism or compressor connected by means, including a solenoid operated clutch mechanism 21, with the fan motor 18.

Each switch 11, 12 and 13 is herein illustrated as comprising a bi-metallic thermostat member 22 connected by means 23 with a switch blade 24. Obviously other types of thermostatic switch means may be employed for these switches.

Each transformer relay set 10 and 14 is herein diagrammatically shown as comprising an electromagnet 25 connected by means 26 with two switch blades 27 and 28. Also a transformer comprising a primary coil 29 and a secondary coil 30 is embodied in each relay set 10 and 14.

Each motor 8 and 20 is herein diagrammatically shown as connected with a thermal cut out comprising a bi-metallic thermostat member 29' having a coil 30' thereon. Thermostat member 29' is connected by means 31 with a switch arm 32 which is interlocked with an inclined switch arm 33. In the event too much current is passed through coil 30' it will produce movement of thermostat member 29', lifting switch arm 32, breaking the circuit between arms 32 aand 33 and allowing arm 33 to drop down. The arm 33 must be manually re-set in contact with arm 32 after the switch provided by these arms has been opened. The arms 33 are connected with the respective motors 8 and 18 by conductor means 34.

In addition to the transformers of the relays 10 and 14 other transformers are provided in the circuit, as follows; a burner ignition step-up transformer comprising primary winding 35 and secondary winding 36, a humidity circuit step-down transformer comprising primary winding 37 and secondary winding 38, a damper motor step-down transformer comprising primary winding 39 and secondary winding 40. The high voltage secondary winding 35 of the ignition transformer is connected by conductors 41 and 42 with ignition points 43 of conventional type.

The control mechanism 5 comprises a manually operable switch blade 44 which is mounted on a pivot 45. The switch blade 44 has an "off" position in which it is shown in the drawing. This blade 44 is adapted to selectively make electrical contact with contact members 46 to 56 inclusive as it is moved angularly on pivot 45. Contacts 46 and 54 are electrically connected with each other by conductor 57. Contacts 48, 50 and 52 are electrically connected with each other by conductors 58. Contacts 53 and 55 are electrically connected with each other by conductor 59. Contacts 47 and 49 are electrically connected with each other by conductor 59'. The contacts 46 to 53 are arranged in pairs, as follows: Contacts 46—47, contacts 48—49, contacts 50—51 and contacts 52—53 are paired. Contacts 54—55 are also paired, and in addition, a third contact 56 is provided in this group. The switch member 44 is arranged to simultaneously contact the two contact members of each pair and the three contact members of the group 54—55—56.

A humidostat 60 is provided in the control mechanism 5. This humidostat 60 is illustrated as comprising a humidity responsive device 61 adapted to open and close a switch 62. Also there is provided in the control mechanism, a dual or double thermostat 63. This dual thermostat is illustrated as comprising a day control temperature responsive device or thermostat 64 and a night control temperature responsive device or thermostat 64'. A mercury tube switch 65 is mounted on a pivot 66 on control mechanism 5. This mercury tube switch is adapted to be angularly moved into one operative position, as shown in the drawing, by engagement of an arm 67 of a clock means 68 with a lever 69 of the mercury tube switch 65. The mercury tube switch 65 is adapted to be tilted or angularly moved to another operative position by manually controlled mechanical means in the form of a link 70 connecting said switch 65 with a lever arm 71 which is pivoted on a pivot 72 and positioned immediately below the switch lever 44 when said switch lever 44 is in the open or "off" position, whereby said lever 71 may be moved downwardly by depressing the switch lever 44 below the "off" position. Preferably a visual signal means will be provided to indicate whether lever 71 is in the day or night position. This may be in the nature of a colored mark 73, see dotted lines, adapted to be covered by the lever 71 in one position. When the lever 71 is thus moved downwardly the switch 65 will be oscillated in a clockwise direction on pivot 66 into a different operative position from that shown in the drawing.

The mercury tube switch 65 is provided at the two ends with the usual two pairs of contacts 74 and 75. One of the contacts 74 is connected by a conductor 76 with suitable switch means 77 operated by the night thermostat member 64'. The other contact 74 is connected by a conductor 78 and conductor 59' with contacts 49 and 47. One of the contacts 75 is connected by conductor 79 with suitable switch means 80 operated by the day thermostat member 64. The other contact 75 is connected by conductor 81 with the conductor 78 which leads to contacts 49 and 47.

*Thermostat circuit*

The source of energy for the thermostat circuit is the secondary winding 30 of the stack switch relay set 10. From this winding 30 the thermostat circuit may be traced as follows: along a conductor 87 to thermostat members 64 and 64'. Then, if thermostat member 64 is in closed circuit position, through said member 64, through switch 80, along conductor 79, through contact points 75, if they are closed, then along conductor members 81 and 78 to contacts 49 and 47. If switches 77 and 74 are closed and either one or both of switches 80 and 75 open then the circuit will be through thermostat member 64', through switch 77, along conductor 76, through contacts 74 and along conductor 78 to contacts 49 and 47. If the switch member 44 is in contact with either contact member 47 or 49 then the thermostat circuit will be from contact 47 or 49, through switch blade 44, along conductors 82, 88 and 89, through switch blade 24 of limit switch 11, along conductor 90, through winding of electromagnet 25 of relay set 10 and back to secondary winding 36 of the transformer of stack switch relay set 10. This completes the thermostat circuit.

*Aquastat circuit*

The aquastat circuit has many parts common to the thermostat circuit and derives its energy from the same source, namely winding 30 of stack switch relay set 10. From this winding 30 the aquastat circuit may be traced along conductors 87 and 91, through blade 24 of aquastat switch 13, along conductor 92 to contact 51. Thence, if switch 44 is positioned on contact 51, the circuit will be along switch 44, along conductors 82, 88 and 89, along blade 24 of limit switch 11, along conductor 90 through winding of electromagnet 25 of stack relay 10 and back to winding 30 of stack relay 10. This completes the aquastat circuit and provides for a control of the heating of water.

*Humidity circuit*

The source of energy for the humidity circuit is the secondary winding 38 of transformer 37—38. From winding 38 this circuit may be traced along conductor 85, through switch 62 of humidostat 60, along conductors 86 and 82, through winding of solenoid 83 and along conductor 84 back to winding 38. This completes the humidity circuit and provides for operation of valve 84'. It is to be noted that the operation of the humidity circuit is not dependent in any way on temperature but said humidity circuit is interconnected with the fan circuit, as will later be apparent.

It will be noted that conductor 82 is common to substantially all of the control circuits which are manually controlled. It will also be noted that the limit switch 11 is interposed in both the thermostat circuit and the aquastat circuit. It will further be noted that the opening of the limit switch 11 does not effect the closing of the fan circuit, the common return of which is a part of the thermostat and aquastat circuits. This limit switch is normally closed, but will open either of these circuits in response to an overheated condition of the heating plant with which it is associated.

Fan motor circuit

The source of energy for the fan motor circuit is the secondary winding 30 of the transformer relay set 14. From this secondary winding 30 the fan motor circuit may be traced along conductors 93 and 94 to contacts 53 and 55 which are connected with each other by conductor 59, thence through switch 44, if it is closed on either contact 53 or 55, thence along conductors 82, 88 and 89, thence through winding of electromagnet 25 and back to source of energy winding 30 of relay set 14. This completes a fan motor control circuit controlling the operation of relay set 14, which, in turn, controls the supply of energy to the fan motor. This fan motor control circuit provides for the manual control of the fan through the master control switch 5. A thermostatically controlled auxiliary fan control circuit is also provided as hereinafter set forth.

Auxiliary fan control circuit

The source of energy for the auxiliary fan control circuit is the same as for the manually controlled fan control circuit, namely, the secondary winding 30 of transformer relay set 14. From this winding 30 the thermostatically controlled auxiliary fan control circuit is along conductors 93 and 95, through switch blade 24 of thermostatic fan switch 12, along conductors 96 and 89 and through the winding of the electromagnet 25 back to the secondary winding 30 of the transformer relay set 14. This thermostatically controlled auxiliary fan control circuit provides means for operating relay 14 and keeping the fan motor 18 energized if the temperature of the fan switch is above a predetermined minimum even though the manually controlled fan circuit is open.

Cooling circuit

The winding 30 of transformer relay set 14 also serves as a source of energy in the control circuit for the cooling means including the refrigerator device 20 and the valve 84'. For the refrigerator device 20 this circuit is from the secondary winding 30 of transformer relay set 14, along conductor 97, through winding of clutch control solenoid 98, along conductor 99 to contact 56, thence along switch 44, if said switch is closed on 56, along conductors 82, 88 and 89 and through the winding of electromagnet 25 of relay set 14 back to source of energy 30. This circuit provides for simultaneously energizing the motor 18 and engaging the clutch means 21 when switch 44 is positioned on contacts 56 and 55. Also upon closing this cooling circuit a circuit to solenoid valve 84' is closed due to the closing of switch means 27—28 of relay 14. This circuit is as follows: From secondary transformer coil 38, which will be energized at this time, the circuit is along conductor 85 through humidostat switch 62, providing it is closed, along conductors 86 and 82, through the winding of electromagnet 83 and along conductor 84 back to winding 38. This opens valve 84' and provides water for cooling as well as putting refrigerating means 20 into operation.

Damper control circuit

The source of energy for the damper control circuit is the secondary winding 40 of the damper motor transformer. From this source 40 the circuit is along conductor 100 and brush 101 to two cam switches 102 and 103, which are operated by the motor 15 through any suitable speed reduction mechanism 15'. One of these cam switches is always in closed circuit and the other is always in open circuit position. If the cam switch 103 is closed and cam switch 102 open, as shown, then the circuit is along conductor 104 to contacts 52—50—48, thence through switch 44 if it is closed on 52, 50 or 48, thence along conductor 82 and conductor 105, through the windings of motor 15 and along conductor 106 back to transformer winding 40. If cam switch 102 is closed and cam switch 103 open then the circuit will be through cam switch 102, along conductor 107 to contacts 54 or 46, said contacts being connected by conductor 57, then through switch 44, if it is closed on contact 54 or 46, thence along conductors 82 and 105, through the windings of motor 15 and along conductor 106 back to the transformer winding 40. These damper circuits provide a control for moving a by-pass damper into one position to deliver warm air at a desired location, as to the rooms of a house, when the circuit is closed through cam switch 102 and for moving said by-pass damper into another position to by-pass the warm air and deliver it to a different location, such as out of doors or into a basement or drying room and avoid delivering it to the rooms of a house, when the circuit is closed through cam switch 103. It is to be noted that each operation or cycle of the cams 102—103 is limited to substantially 180 degrees.

The by-pass damper connection, shown somewhat diagrammatically, may comprise a crank 108 on the shaft of cams 102—103. The crank 108 is connected by a connecting rod 109 with a lever 110. The lever 110 is connected with a by-pass damper 111 through a common pivot 112. The by-pass damper 111 is adapted to be moved into a position, as shown by full lines, to close a by-pass opening 114 from a heating plant to the atmosphere or into another position, as shown by dotted lines, to close an opening 113' between the plant and a warm air take off bonnet 113 at the top portion of said heating plant. The bonnet 113 is preferably connected by suitable hot air conduits, one of which is shown, with rooms to be heated. The by-pass opening 114 may open to the outside atmosphere so that heat which is generated in hot weather incidental to the heating of water for domestic use may be liberated out of doors to avoid heating the rooms connected with bonnet 113. Also in some instances it is desirable to connect by-pass opening 114 with a drying room or laundry room in the basement of a home or apartment building or to permit hot air from by-pass opening 114 to discharge directly into a basement which is used as a drying room or which, for any other reason is to be heated. When this is done the furnace may be operated to heat the drying room or basement without heating the rooms connected with the bonnet 113 and irrespective of whether or not water is being heated. The damper control circuit and by-pass damper means thus make it possible to use the heating plant exclusively for heating water for domestic purposes in warm weather without heating the rooms connected with the heating plant and further make it possible to heat a basement or drying room without heating the rooms connected with the plant. Obviously other by-pass means may be provided for disposing of heated air when the presence of the same in a house is undesirable.

It is to noted that the control circuits hereinbefore described are all operated through step down transformers. These circuits preferably operate on approximately twenty volt current. Other source of supply circuits, preferably operating on a higher voltage, as 110 to 220 volts, are provided as hereinafter set forth.

Ignition circuit

Current, preferably at 110 to 120 volts, is supplied through source of supply conductors 115 and 116 to switch members 27 and 28 of stack switch relay 10. When these switch members 27 and 28 are in closed position a circuit is completed from conductor 115, through blade 27, along conductor 117, through primary winding 36 of the ignition transformer and along conductor 118 and switch blade 28 to source of supply conductor 116. This energizes the step up ignition transformer and delivers current at high voltage suitable for ignition purposes through conductors 41 and 42 to the ignition points 43 when switch 27—28 of relay 10 is in closed position.

Burner motor circuit

The burner motor circuit may be traced from conductor 115 through switch blade 27 of relay 10, when closed, along conductors 117 and 119, through coil 30' of burner motor thermal cut out, through switch members 32 and 33, along conductor 34, through the windings of burner motor 8 and along conductor 118 and switch blade 28 of relay 10 to source of supply conductor 116. This provides current for the burner motor 8 when the switch 27—28 of relay 10 is closed.

Fan motor operating circuit

The wires 115 and 116 also constitute an outside source of energy to the transformer of the relay set 14 and to the fan motor 18. The circuit to the fan motor is from source of supply wire 115, through switch blade 27 of relay set 14, it being assumed that switch 27—28 is closed, along conductor 115' through thermal cut out 30'— 32—33 of motor 18, along conductor 34 through motor 18 along conductor 116' and through blade 28 of relay 14 to source of supply conductor 116. This provides a circuit, controlled by electromagnet 25 for energizing motor 18 to drive fan 19 and operate cooling means 20.

It is to be noted that the source of supply wires 115' and 116' are also connected with the primary winding 37 of the humidity circuit transformer and source of supply wires 115, 116 are connected with the primary winding 39 of the damper motor transformer.

When the switch member 44 is in the "off" position, as shown in the drawing, all of the devices controlled by the control circuits will ordinarily be inoperative. There may be one exception to this however in the event the heating plant has been in operation the thermostatic fan switch 12, which is positioned in the bonnet portion of the heating plant, may remain closed or may intermittently open and close due to the heat remaining in the combustion chamber and may thus keep the fan operating either intermittently or continuously until the heating plant cools off.

When switch member 44 is moved to the "on" position in contact with contact members 46 and 47 this completes the thermostat circuit through contact 47 as respects switch 45. If at this time the thermostat circuit is closed through either thermostat member 64 or 64' the circuits to the burner motor 8 and ignition transformer 36—35 will be closed thus putting the burner 6 into operation.

The closing of switch 44 by reason of contact with member 46 completes the circuit to the damper motor 15 in so far as switch 44 is concerned. If damper 111 is open as respects bonnet 113 and closed as respects by-pass escape opening 114 and cams 102 and 103 are in the position shown, this circuit will be broken at the location of cam 102 and the damper motor will not be energized. If the damper 111 is in the opposite position to open by-pass 114 and close the passageway to bonnet 113 then the circuit through cam 102 will be closed and motor 15 will be energized long enough to angularly move the cams 102 and 103 through substantially 180 degrees thus closing the by-pass 114 and opening the passageway to the heating bonnet 113. This provides for always properly positioning the by-pass damper 111 to deliver heat to the bonnet 113 and to close the by-pass 114 when switch 44 is in the "on" position. This same action takes place when the switch 44 is moved onto the contact member 54, due to the fact that contacts 54 and 46 are electrically connected by conductor 57.

It is to be noted that when switch 44 is positioned on contact 46 it is also positioned on contact 47 completing a thermostat circuit and indicating a demand for heated air. For this position the by-pass damper will be positioned to deliver heated air to bonnet 113. If switch 44 is positioned on contact 54, and at the same time on contacts 55 and 56, this will indicate a demand for a circulation and cooling of the air. For this position of the switch member 44 the by-pass damper will also be positioned to deliver to the bonnet 113 air which has been cooled by reason of the operation of valve 84' or refrigerating means 20 or both. Also the fan circuit to relay 14 will be completed by reason of contact between switch 44 and contact member 55 insuring continuous operation of the fan motor 18 for this position and also supplying current to the primary winding 37 of the humidity circuit transformer, whereby, if the humidostat switch 62 is closed, water may be allowed to flow through valve 84' to humidifying means 84" in the heating plant 4 or passageways connected therewith.

If switch 44 is moved onto contacts 48—49, then all circuits are the same as when switch 44 is on contacts 46—47, except by-pass damper 111 is open as respects by-pass opening 114 and closed as respects bonnet 113 to permit by-passing of heated air. For this position the thermostat circuit will be closed and the damper motor circuit through cam 103 will be closed positioning the damper 111 to close passageway 113' and open by-pass opening 114. This makes it possible, for instance, to deliver heat through by-pass 114 to the basement or to a clothes drier or to the outside. If switch 44 is moved onto contacts 50, 51 the contact with 50 will keep the by-pass damper 111 open as respects the by-pass 114 in the same manner as just described in connection with contact 48 it being noted that contacts 48 and 50 are electrically the same. Contact of switch member 44 with contact member 51 completes the aquastat circuit through the aquastat switch 13 instead of through the thermostat 63. As this aquastat switch is positioned on or in contact with a hot water storage tank 3 wherein water heated by burner 6 is stored this always maintains a supply of hot water when switch 44 is positioned on contact 51. If switch 44 is moved onto contacts 52—53 the contact of the same with contact member 52 will keep the by-pass damper 111 open as respects the by-pass 114 in the same manner as just described in connection with contacts 48 and 50 due to 48, 50 and 52 being electrically the same. The positioning of switch member 44 on contact member 53 completes the fan circuit. The completing of this circuit keeps the fan operating continuously while the by-pass damper is open as respects the by-pass 114. This makes it possible to remove foul air from the house without operating the burner 6. While the fan is thus operating the burner 6 will be shut off as the circuits through the thermostat means 63 and aquastat switch 13 are broken.

The day and night control mechanism connected with dual thermostat 63 makes it easy to shift from day to night control and vice versa without requiring any calculations on the part of the user and with no liability of error. At the time of retirement at night the user depresses switch lever 71 through the operation of switch member 44 tilting mercury switch 65 and rendering the night thermostat operative. At the hour which has been selected for increasing the temperature of the house in the morning the arm 67 of clock 68 will tilt the mercury switch 65 in the opposite direction and transfer control to the day thermostat.

From the foregoing description it will be seen that this control system provides a combination of manual and automatic controls by which a complete air conditioning, air circulating and water heating system may be controlled from a single master control switch to provide a plurality of combinations and attain certain new, novel and desired results not heretofore attained.

Among the advantages obtained by this control are the following: The fan 19 may continue to operate and circulate what heat is given off by the heating plant after the switch 44 is moved to the "off" position. The thermostat circuits and by-pass damper circuits are combined in such a way that the by-pass damper is always correctly positioned to provide for the delivery of heated air to the house when the switch member is moved to the house heating or "on" position and will always be correctly positioned to prevent the delivery of heated air to the rooms of the house when the switch 44 is moved onto contacts 48—49, 50—51, or 52—53 to open the by-pass damper or to heat water in hot weather or to ventilate the house without heating the same. The circuits are further combined and arranged in such a manner that cooling can be attained without operating the burner and with the by-pass damper being automatically moved to the correct position and so that the proper humidification of the air can always be attained without delivering too much water through the valve 84'.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In electric control means of the class described, a control unit; a plurality of control circuits connected with said control unit; a manually operable control switch selectively controlling said control circuits; a dual thermostat comprising a night thermostat member and a day thermostat member, said two thermostat members having circuit means adapted to electrically connect said thermostat members with said control switch; time switch means adapted selectively to electrically connect either of said thermostat members with said control switch means; clock means adapted to move said time switch means into electrically connected position as respects said day thermostat member; and switch moving means connecting said time switch means with said manually operable control switch whereby said time switch may be moved by operation of said manually operable control switch into electrically connected relation with said night thermostat member.

2. In electric control means of the class described, a fan providing a circulation of air; a fan motor; a fan motor control circuit; an oil burner; a furnace heated by said oil burner; oil burner circuits; manual control means connected with said fan motor control circuit and said oil burner circuits adapted to open said fan motor circuit and said oil burner circuits for the purpose of shutting down said oil burner and deenergizing said fan motor; and a thermostatically controlled fan circuit switch in said circuits between said fan motor and said oil burner controlled by the heat of said furnace and operable to energize said fan motor when said oil burner circuits and said fan motor circuit are open due to the opening of said manual control means to maintain a circulation of air through the furnace after the oil burner becomes inoperative and until the furnace becomes cool.

3. In an electric control means of the class described, a thermostat circuit; heat generating means adapted to heat air and connected by hot air conduits with rooms to be heated and controlled by said thermostat circuit; a by-pass control circuit; by-pass air control means governing the delivery of heated air from said heat generating means to the hot air conduits connected with the rooms, whereby heated air may be delivered to rooms to be heated or may be prevented from passing to said rooms and directed to other locations; switch means for simultaneously closing said two circuits; and electrically actuated means in said by-pass control circuit for selectively positioning said by-pass air control means upon the closing of said circuits and determining whether or not heated air is to be delivered to said conduits connected with said rooms.

4. In an electric control means of the class described, a thermostat circuit; heat generating means adapted to heat air and connected by hot air conduits with rooms to be heated and controlled by said thermostat circuit; a thermostatically controlled switch in said thermostat circuit adapted to open and close said thermostat circuit; a by-pass control circuit; a by-pass damper selectively controlling the discharge of heated air from said heat generating means whereby said heated air may be delivered to rooms to be heated or may be prevented from passing to said rooms and directed to other locations; electrically actuated means in said by-pass control circuit selectively positioning said by-pass damper; and manually operated switch means independent of said thermostatic switch for simultaneously closing said two circuits to render said by-pass control circuit operative and selectively position said by-pass damper to direct heated air to said hot air conduits or to prevent passage of heated air to said hot air conduits.

5. In an electric control means of the class described, a thermostat circuit; heat generating means adapted to heat air and connected by hot air conduits with rooms to be heated and controlled by said thermostat circuit; a thermostatically controlled switch in said thermostat circuit arranged to open and close said thermostat circuit; a by-pass control circuit including two branch circuits; a motor connected in said by-pass control circuit; two selective switch means in the respective branch circuits of said by-pass control circuit operable by said motor and each adapted to break the branch circuit in which it is connected at the end of a predetermined cycle of operation of said motor; manually operated switch means having one position in which it closes said thermostat circuit and one branch of said by-pass control circuit and another position in which it closes said thermostat circuit and the other branch of said by-pass control circuit; and a by-pass damper movable into a position to direct heated air into said hot air conduits when said thermostat circuit and one of said by-pass circuit branches is closed and movable into a position to exclude heated air from said hot air conduits when said thermostat circuit and the other by-pass circuit branch are closed by said manually operated switch means.

6. In an electric control means for combined air heating and water heating apparatus, heat generating means adapted to heat air and water and connected by hot air conduits with rooms to be heated; an aquastat circuit cooperating in the control of said heat generating means; an aquastat switch in said aquastat circuit responsive to the temperature of water heated by said heat generating means; by-pass damper means connected with said heat generating means movable into one position to direct heated air to said hot air conduits and heat the rooms connected therewith and into another position to exclude heated air from said hot air conduits whereby heating of said rooms may be avoided and at the same time water may be heated; electric means for operating said by-pass damper means; by-pass damper control circuit means controlling said operating means adapted when closed to position said by-pass damper to exclude heated air from said conduits; and manually operable switch means for simultaneously closing said aquastat circuit and said by-pass control circuit.

7. In an electric control for air heating, water heating and air circulating apparatus for use with a furnace housing which is connected with rooms by conduit means adapted to conduct air from said furnace housing to said rooms and by other conduit means adapted to conduct air from said rooms to said furnace housing; heat generating means; a thermostat circuit adapted to cooperate in the control of said heat generating means; a thermostatically operated switch in said thermostat circuit; an aquastat circuit also adapted to cooperate in the control of said heat generating means; a thermostatically operated switch in said aquastat circuit operated by the temperature of water heated by said heat generating means; by-pass means adapted selectively to direct heated air to rooms connected with said air conditioning means or to divert heated air away from said rooms; by-pass control circuit means including a branch circuit operative when energized to position said by-pass means to deliver heated air to said rooms and another branch circuit operative when energized to position said by-pass means to divert heated air away from said rooms; and manually operable control switch means selectively movable to close said thermostat circuit and said first mentioned branch of said by-pass control circuit to heat air and water and direct heated air to said rooms or to close said aquastat circuit and said last mentioned branch of said by-pass control circuit to divert heated air away from said rooms when water is being heated.

8. In an electric control for air conditioning means for use with a furnace housing which is connected with rooms by conduit means adapted to conduct air from said furnace housing to said rooms and by other conduit means adapted to conduct air from said rooms to said furnace housing; fan means connected with said conduit means; a fan motor driving said fan means; a fan motor circuit controlling said fan motor; by-pass damper means connected with said conduit means and movable into different operative positions to direct circulating air to the rooms or to divert said circulating air away from the rooms; by-pass control circuit means embodying a plurality of branch circuits, one of which is operative when energized to position said by-pass damper means to divert air away from said rooms; and manually operable control switch means selectively movable to close said fan motor circuit and said branch circuit of said by-pass control circuit whereby the fan will be operated and air will be drawn from said rooms to ventilate said rooms without returning said air to said rooms.

9. In an electric control for air conditioning means for use with a furnace housing which is connected with rooms by conduit means adapted to conduct air from said furnace housing to said rooms and by other conduit means adapted to conduct air from said rooms to said furnace housing; air cooling means connected with said conduit means; fan means connected with said conduit means; a fan motor driving said fan means; a fan motor circuit controlling said fan motor; by-pass damper means connected with said conduit means and movable into different operative positions to direct circulating air to the rooms or to divert said circulating air away from the rooms; by-pass control circuit means embodying a plurality of branch circuits, one of which is operative when energized to position said by-pass damper means to direct air to said rooms; a cooling circuit adapted when closed to provide for operation of said cooling means; and manually operable control switch means selectively movable to close said cooling circuit and said fan motor circuit and said branch circuit of said by-pass control circuit whereby the fan will be operated to provide a circulation of cooled air in said conduit means and said rooms.

ARTHUR LEROY SMITH.